US009576575B2

(12) United States Patent
Heide

(10) Patent No.: US 9,576,575 B2
(45) Date of Patent: Feb. 21, 2017

(54) PROVIDING VOICE RECOGNITION SHORTCUTS BASED ON USER VERBAL INPUT

(71) Applicant: Toyota Motor Engineering & Manufacturing North America, Inc., Erlanger, KY (US)

(72) Inventor: Luke D. Heide, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/524,872

(22) Filed: Oct. 27, 2014

(65) Prior Publication Data
US 2016/0118048 A1   Apr. 28, 2016

(51) Int. Cl.
*G10L 21/00* (2013.01)
*G10L 15/22* (2006.01)

(52) U.S. Cl.
CPC .......... *G10L 15/22* (2013.01); *G10L 2015/223* (2013.01)

(58) Field of Classification Search
CPC ................ G06F 2203/0381; G06F 3/016
USPC ....................................................... 704/275
See application file for complete search history.

(56) References Cited

U.S. PATENT DOCUMENTS

| | | | | |
|---|---|---|---|---|
| 6,505,155 B1* | 1/2003 | Vanbuskirk | ............. | G10L 15/22 704/246 |
| 6,791,529 B2* | 9/2004 | Shteyn | .................... | G10L 15/26 345/156 |
| 8,312,660 B1* | 11/2012 | Fujisaki | .................. | F41A 17/08 42/70.01 |
| 8,374,862 B2 | 2/2013 | Bocking | | |
| 8,407,056 B2 | 3/2013 | Jordan et al. | | |
| 8,453,058 B1* | 5/2013 | Coccaro | ............... | G06Q 10/103 705/319 |
| 8,880,402 B2* | 11/2014 | Wasson | ................... | G10L 15/22 379/67.1 |
| 9,190,054 B1* | 11/2015 | Riley | ...................... | G10L 15/18 |
| 2004/0176958 A1* | 9/2004 | Salmenkaita | ..... | H04M 1/72561 704/275 |

(Continued)

OTHER PUBLICATIONS

BMW Technology Guide: Voice control system, [retreived Jul. 1, 2014] retreived from the Internet: <http://www.bmw.com/com/en/insights/technology/technology_guide/articles/voice_control_system.html>, 1 page.

(Continued)

*Primary Examiner* — Jakieda Jackson
(74) *Attorney, Agent, or Firm* — Christopher G. Darrow; Darrow Mustafa PC

(57) ABSTRACT

A method for determining a voice command shortcut includes receiving a first voice command providing instructions for performing a particular task and a second voice command providing additional instructions for performing the same task. The voice command shortcut may be used in place of the first and second voice commands, which are typically submitted in response to system prompts. The availability of a voice command shortcut is determined based on the first and second voice commands. If a voice command shortcut is available, an audible and/or visual notification may be provided to inform the user of the available voice command shortcut.

18 Claims, 4 Drawing Sheets

(56) References Cited

U.S. PATENT DOCUMENTS

| | | | |
|---|---|---|---|
| 2006/0059110 A1* | 3/2006 | Madhok | G06Q 20/04 705/75 |
| 2007/0083366 A1* | 4/2007 | Peters | G10L 15/26 704/235 |
| 2007/0124149 A1 | 5/2007 | Shen et al. | |
| 2008/0288259 A1* | 11/2008 | Chambers | G10L 15/22 704/275 |
| 2008/0294727 A1* | 11/2008 | Moody | G06Q 10/107 709/206 |
| 2011/0301943 A1* | 12/2011 | Patch | G10L 15/26 704/9 |
| 2012/0253790 A1* | 10/2012 | Heck | G06F 17/30867 704/9 |
| 2012/0253823 A1* | 10/2012 | Schalk | G08G 1/096877 704/270.1 |
| 2012/0265528 A1* | 10/2012 | Gruber | G10L 15/18 704/235 |

OTHER PUBLICATIONS

Uconnect Voice Commands Quick Guide, [retreived Jul. 1, 2014] retreived from the Internet: <http://www.driveuconnect.com/pdf/UconnectVoiceCommands.pdf>, 8 pages.

* cited by examiner

PROVIDING VOICE RECOGNITION SHORTCUTS BASED ON USER VERBAL INPUT

BACKGROUND

Automotive vehicles may include hands free communication units allowing an occupant of the vehicle to interact with various vehicle systems and to place and receive cellular telephone calls without having to take a hand off the steering wheel. The hands free communication unit may include microphones or microphone arrays placed within a passenger compartment of the vehicle to receive verbal commands from the occupant. The hands free communication unit may be connected to the vehicle's audio speaker system allowing the occupant to listen to system prompts and notifications and to a person on the other end of a telephone call through the vehicle speakers. The hands free communication unit may be either wired or wirelessly connected to the occupant's cellular telephone, such that the occupant can participate in a telephone conversation through the microphone and audio speakers.

The hands free communication units may utilize a voice recognition system for enabling the occupant to control various vehicle systems and features and connected mobile devices, such as the occupant's cellular telephone, through vocal commands. The voice recognition system may be coupled with a vehicle navigation system integrated into the vehicle, thereby allowing the occupant to input a route destination through vocal commands. Integration of the voice recognition system with the vehicle is a useful feature that allows the vehicle occupant to control various devices without diverting attention from the road.

The voice recognition system may be configured to recognize a predetermined set of verbal commands. Simple voice commands may be used, for example, to initiate phone calls, select radio stations or play music from a vehicle integrated audio system or an interconnected mobile device, such as a smartphone, MP3 player or music-loaded flash drive. The voice recognition system may provide natural-language speech recognition that enables the occupant to use full sentences and common phrases. Multiple discrete verbal commands may be required to commence a particular task, such as initiating a phone call. The verbal commands may be provided in response to prompts from the vehicle's audio system. For example, an occupant may make a verbal request to call a person identified in a contact list. If the selected contact has multiple phone numbers, the audio system may prompt the occupant to select one of the listed phone numbers to call.

To minimize distraction to a vehicle operator, some voice recognition systems may permit combining multiple discrete voice commands into a single continuous command string. The operator, however, may not always be aware of this functionality or understand how to properly format the command string. In those circumstances the operator may benefit from receiving instructions and guidance regarding the availability of alternatively formatted voice command strings.

SUMMARY

Disclosed is a method for determining a voice command shortcut that may be used in place of a corresponding series of multiple voice commands typically submitted in response to system prompts. The voice command shortcut provides a convenient and efficient method of verbally controlling various vehicle controls and systems and connected mobile devices. A voice recognition system may be employed for determining voice command shortcuts based on a user's previously input voice commands. The voice recognition system may receive a series of voice commands from a user providing instructions for performing a particular task, such as initiating a wireless phone call. The voice commands may be provided in response to communication system prompts. The voice recognition system determines if a corresponding voice command shortcut is available based on the previously input series of user voice commands. The user may use the voice command shortcut for operating vehicle controls and systems and connected mobile devices. An audible and/or visual notification may be provided to inform the user of the available voice command shortcut.

BRIEF DESCRIPTION OF THE DRAWINGS

The various features, advantages and other uses of the present apparatus will become more apparent by referring to the following detailed description and drawings, in which.

DETAILED DESCRIPTION

Figure 1:
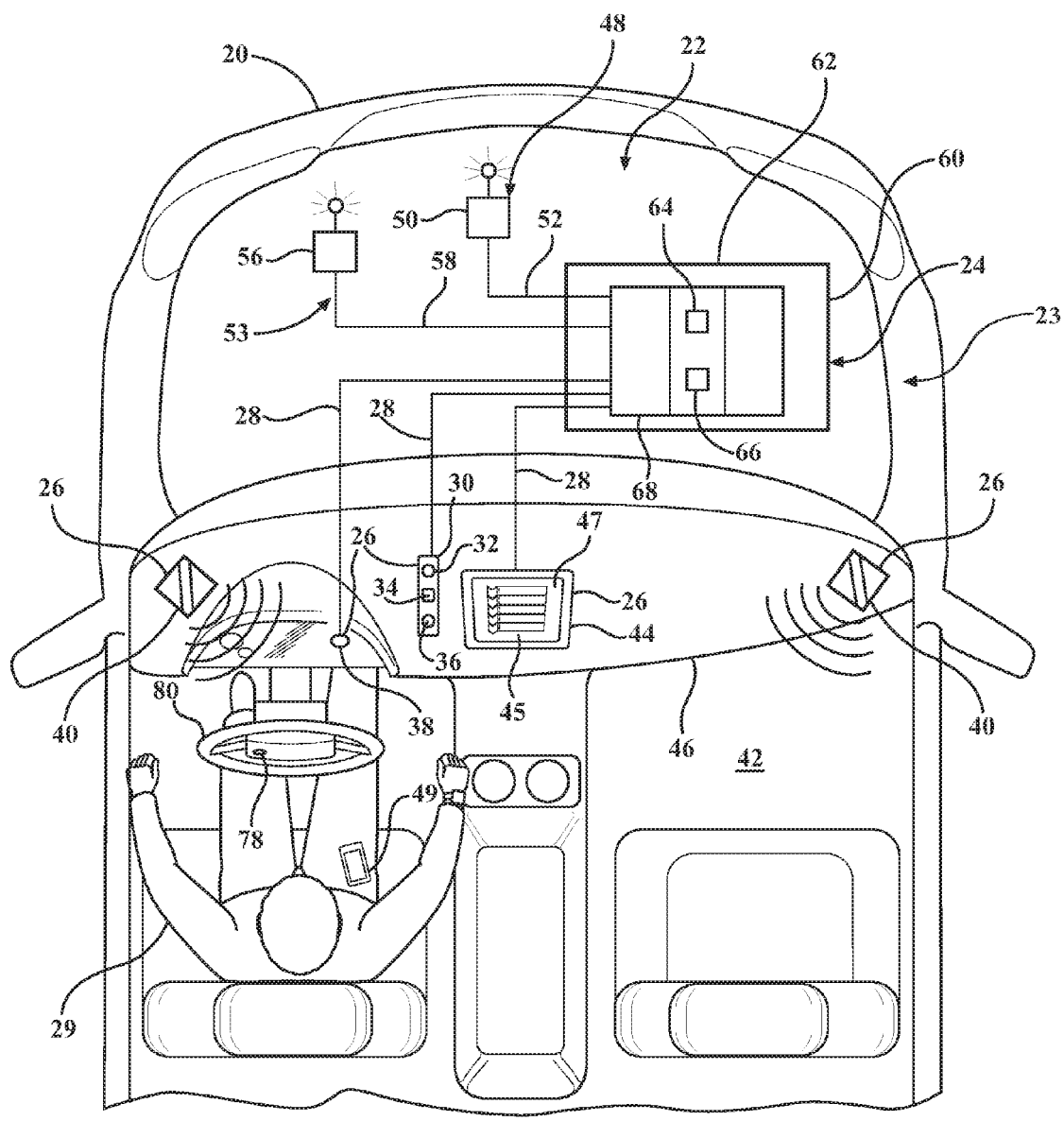
FIG. 1 is a schematic illustration of an automotive vehicle including an exemplary voice actuated communication system employing a voice recognition system.

Disclosed is a method for determining a voice command shortcut that may be used in place of a corresponding series of multiple voice commands typically submitted in response to system prompts. The voice command shortcuts provide a convenient and efficient method of verbally controlling various vehicle controls and systems and connected mobile devices. Voice command shortcuts are particularly advantageous to avoid having a driver divert attention from the road when attempting to operate various vehicle systems and controls.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIG. 1, disclosed is a voice actuated communication system 22 incorporated in a vehicle 20. The voice actuated communication system 22 includes a voice recognition system 23 configured to determine voice command shortcuts based on a user's previously input voice commands. The voice recognition system 23 may receive a series of voice commands from a user providing instructions to the voice actuated communication system 22 for performing a particular task, such as initiating a wireless phone call. The voice commands may be provided in response to communication system prompts. The voice recognition system 23 operates to determine a corresponding voice command shortcut based on the previously input series of user voice commands. The user may use the voice command shortcut to quickly and efficiently instruct the voice actuated communication system 22 to perform a particular task. The voice actuated communication system 22 may broadcast an audible and/or visual notification informing the user of the suggested voice command shortcut.

With continued reference to FIG. 1, the voice actuated communication system 22 may include a vehicle computing device 24 and other operably interconnected components. For example, the voice actuated communication system 22 may generally include input/output hardware 26 communicatively coupled to the vehicle computing device 24 through one or more communication links 28. The input/output hardware 26 serves as an interface between a user and the voice actuated communication system 22. As used herein, the term "user" refers generally to a driver 29 operating the vehicle 20 and any other person present within the vehicle. The input/output hardware 26 may include any device capable of transforming tactile and/or audio inputs into an electrical signal capable of transmission via the communication links 28, and/or transforming electrical signals into visual and/or audio outputs that may be sensed by the user. Each individual component of the input/output hardware 26 may include one or more processors and one or more memories. Alternatively, each individual component of the input/output hardware 26 may be configured without a processor and/or a memory. Multiple individual input/output hardware 26 components may be integrated into a single unit.

The input/output hardware 26 may include, for example, a tactile input device 30, which may include various input controls, for example, a button 32, a switch 34, a knob 36, or the like. The physical motion of the input controls on the tactile input device 30 can be transmitted to the computing device through the communication link 28.

The input/output hardware 26 may further include a microphone 38 for receiving verbal input from the user and a speaker 40 for transforming electrical signals into sound that can be heard by the user. The microphone 38 may be any sensor that transforms sound waves into an electrical signal. The microphone 38 may be located within a passenger compartment 42 of the vehicle 20 at location suitable for receiving verbal input from the user. The speaker 40 and microphone 38 may be part of a vehicle audio system 41 (see FIG. 2).

The input/output hardware 26 may further include one or more displays 44 for visually presenting data. The display 44 may be located within the passenger compartment 42 of the vehicle 20, for example, in a dash panel 46. The display 44 may employ any of various display technologies capable of transmitting a visual output, and may include a touch screen 45 capable of detecting the presence and location of a tactile input on a surface 47 of the display 44. The display 44 may be configured to receive mechanical input directly upon the optical output provided by the display 44.

The voice actuated communication system 22 may employ a personal area network (PAN) 48 for wirelessly transmitting data between a mobile communication device, such as a mobile phone 49 or other mobile computing device, and vehicle computing device 24. Various wireless technologies may be employed, such as Bluetooth, IrDA, Wireless USB, Z-Wave, ZigBee, and other near field communication protocols. A PAN interface hardware 50 configured for transmitting and receiving data over the PAN 48 may be communicatively connected to the vehicle computing device 24 though a PAN communication link 52. The PAN interface hardware 50 may include a transmitter for wirelessly transferring data from the vehicle computing device 24 to a communicatively connected mobile communication device and a receiver for receiving and wirelessly transferring data from the communicatively connected mobile communication device to the vehicle computing device 24. Accordingly, the PAN interface hardware 50 may include an antenna and/or other communication transceiver for sending and/or receiving any wireless communication between the communicatively connected mobile communication device and the vehicle computing device 24.

Figure 2:
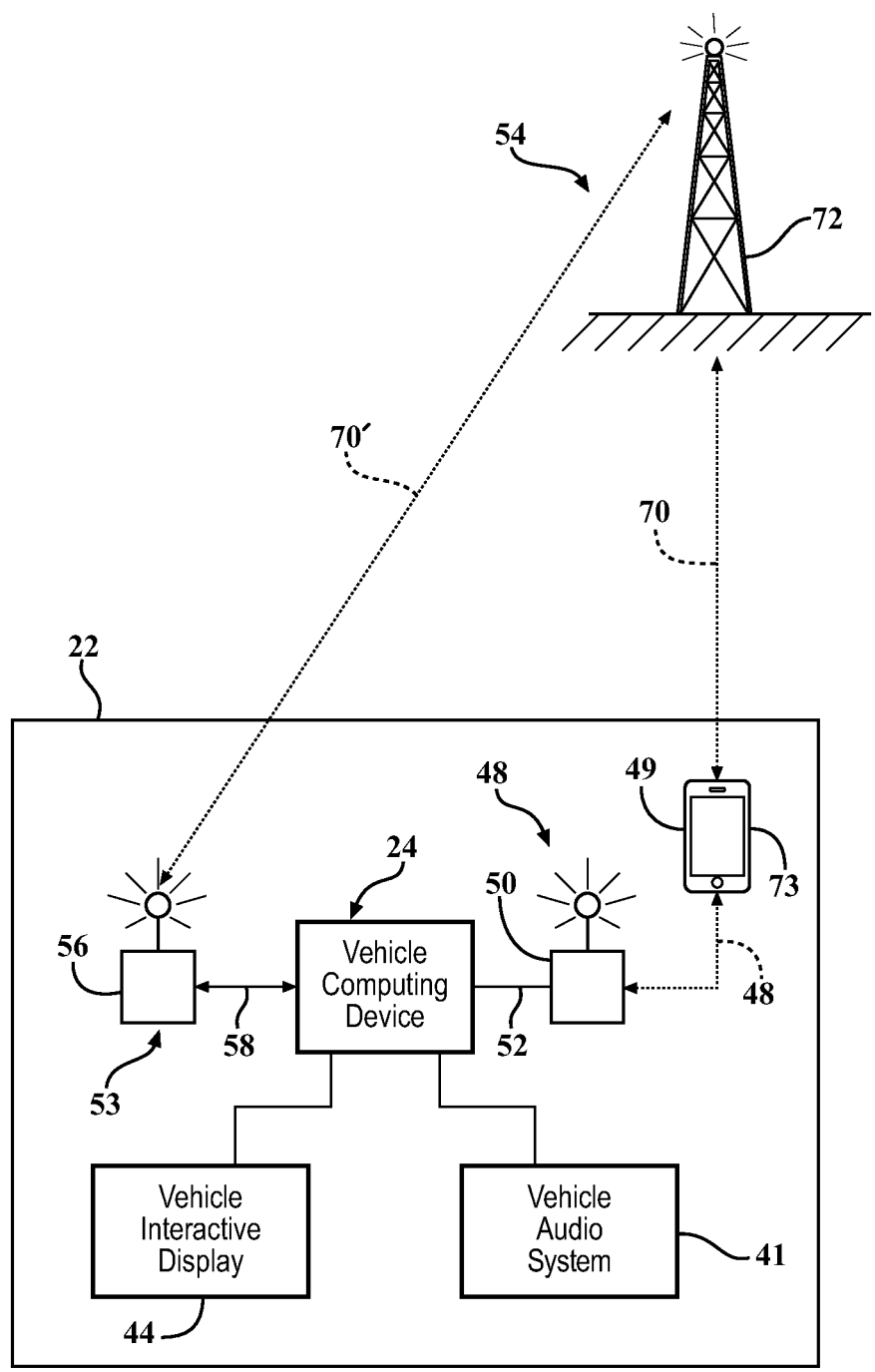
FIG. 2 is a schematic illustration of the voice actuated communication system wirelessly connected to various mobile devices and networks.

With reference to FIGS. 1 and 2, the voice actuated communication system 22 may employ an integrated mobile communication system 53 that may include variously configured communication hardware for wirelessly transmitting data between the vehicle computing device 24 and a mobile network 54, such as a cellular network. The mobile network 54 enables the vehicle computing device 24 to wirelessly communicate with other devices connected to the mobile network 54.

The voice actuated communication system 22 may include an integrated mobile network transceiver 56 configured to transmit and receive data over the mobile network 54. The mobile network transceiver 56 may be communicatively connected to the vehicle computing device 24 though a mobile network transceiver communication link 58. The mobile network transceiver 56 may include a transmitter for wirelessly transferring data from the vehicle computing device 24 to the mobile network 54 and a receiver for wirelessly transferring data from the mobile network 54 to the vehicle computing device 24.

With particular reference to FIG. 2, PAN 48 is operable to communicatively couple the vehicle computing device 24 with one or more mobile communication devices 73 that may be used to establish a wireless mobile communication link 70 between the voice actuated communication system 22 and the mobile network 54. The mobile network 54 may be served by at least one fixed-location transceiver or base station 72. The mobile communication devices 73 may include one or more mobile phones 49, as well as other mobile computing devices, such as a personal computer, laptop computer, tablet computer, and personal digital assistant (PDA). Each of the one or more mobile communication devices 73 can include one or more processors and one or more memories. The one or more processors can execute logic to wirelessly connect the vehicle computing device 24 to the mobile network 54.

The mobile communication devices 73 may be individually capable of independently establishing the wireless mobile communication link 70, or multiple mobile communication devices 73 may operably cooperate with one another to establish the wireless mobile communication link 70. For example, mobile phone 49 may be communicatively connected to vehicle computing device 24 via PAN 48. Mobile phone 49 is operable to establish the wireless mobile communication link 70 between the mobile network 54 and the voice actuated communication system 22.

With continued reference to FIG. 2, voice actuated communication system 22 may include the previously describe integrated mobile communication system 53. The system's mobile network transceiver 56 may be configured to communicatively connect vehicle computing device 24 wirelessly to the mobile network 54 via a wireless mobile communication link 70'. The mobile network transceiver 56 may be communicatively connected to the vehicle computing device 24 though the mobile network transceiver communication link 58. The integrated mobile communication system 53 may provide a primary or alternate means for communicatively connecting the vehicle computing device 24 to the mobile network 54.

With reference to FIG. 1, the voice recognition system 23 may be incorporated in the vehicle computing device 24, or may alternatively be configured as a separate component with its own processor and memory. The voice recognition system may be communicatively connected to the vehicle computing device 24 when configured as a separate component.

The vehicle computing device 24 may include a processor 60 communicatively coupled with a memory 62. The processor 60 may include any device capable of executing machine-readable instructions, which may be stored on a non-transitory computer-readable medium, for example memory 62. Processor 60 may include a controller, an integrated circuit, a microchip, a computer, and/or any other computing device. The memory 62 may include any type of computer readable medium suitable for storing data 64 and algorithms 66. For example, the memory 62 may include RAM, ROM, a flash memory, a hard drive, and/or any device capable of storing machine-readable instructions.

The vehicle computing device 24 may also include an input/output interface 68 for facilitating communication between the processor 60, input/output hardware 26, the PAN network interface hardware 50 and the mobile network transceiver 56. Although the vehicle computing device 24 is schematically illustrated as including a single processor 60 and a single memory 62, in practice the vehicle computing device 24 may include a plurality of components, each having one or more memories and/or processors that may be communicatively coupled with one or more of the other components. The vehicle computing device 24 may be a separate stand-alone unit, or may be configured as part of a central vehicle control system.

Algorithms and data for the voice recognition system 23 may reside in memory 62 of the vehicle computing device 24. Alternatively, the voice recognition algorithms and/or data may reside in a memory separate from computing device 24. The voice recognition system 23 may utilize any speech recognition software capable of converting spoken words into instructions deliverable to the voice actuated communication system 22 for operating the vehicle controls and interconnected mobile devices. The voice recognition system 23 enables the user to control, through verbal commands, various vehicle systems and features and connected mobile devices 73.

With continued reference to FIG. 1, the voice recognition system 23 may be configured to recognize a set of predetermined voice commands that may be stored in memory 62 of vehicle computing device 24. The user may use the predetermined voice commands, for example, to initiate phone calls, select radio stations or play music from a vehicle integrated audio system or an interconnected mobile device, such as a smartphone, MP3 player or music-loaded flash drive. The voice recognition system 23 may also utilize natural-language speech recognition that enables the user to use full sentences and common phrases.

The voice recognition system 23 may receive a series of user voice commands providing instructions to the voice actuated communication system 22 for performing a particular task, such as initiating a wireless phone call. The user voice commands are typically provided in response to prompts from the voice actuated communication system 22.

The voice recognition system 23 may further include a set of voice command shortcuts 76 that correspond with a particular series of voice commands for instructing the voice actuated communication system 22 to perform a particular task. The voice command shortcuts may be stored in memory 62 of vehicle computing device 24. Alternatively, the voice command shortcuts may reside in a memory separate from computing device 24. The voice command shortcut may be used in place of the corresponding series of voice commands for instructing the voice actuated communication system 22 to perform a particular task.

Figure 3:
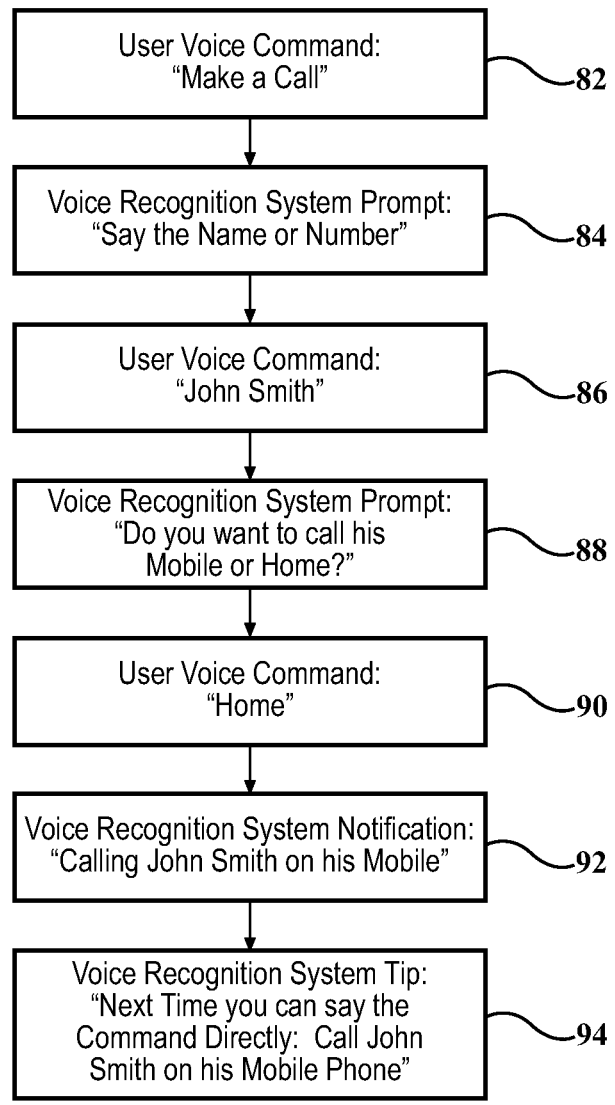
FIG. 3 schematically illustrates an exemplary command voice command sequence for initiating a wireless phone call.

A series of user voice commands may be required to provide all the information required for the voice actuated communication system 22 to perform the requested task. An example of a series of user voice commands for instructing the voice actuated communication system 22 to initiate a wireless phone call is illustrated in FIG. 3. A voice recognition session may be commenced by activating the voice recognition system 23. This may be accomplished by actuating a voice recognition control 78, for example, a finger control on a steering-wheel 80 of the vehicle 20. Triggering of the voice recognition system 23 may be signaled by an audible prompt from audio system 41.

Following the audio prompt, the voice recognition session may include a "listening window" during which the voice recognition system 23 may accept user voice commands for recognition. For example, the user may recite the voice command "Make a Call" (voice command 82) to instruct the voice activated communication system to initiate a wireless phone call. The voice recognition system 23 may determine, based on the voice command 82, whether additional information is required to complete the requested task. In this example, the requested task is to initiate a wireless phone call. To perform the requested task the user will also need to identify a name from a contact list or provide a phone number to call, neither of which was provided in voice command 82. This may cause the voice recognition system 23 to issue a system prompt 84 requesting the user to provide the additional inform. System prompt 84 may include a statement such as "Say the Name or Number." The system prompt 84 may include an audible prompt broadcast from audio system 41 and/or a visual prompt displayed on display 44.

The user may respond to system prompt 84 by verbally providing the requested information through an additional voice command 86. In this example, the user identifies a person ("John Smith") from a contact list to call. The contact list may include a list of user defined contact names and corresponding phone numbers. The contact names and associated phone numbers may be stored in memory 62 of vehicle computing device 24, or may be stored in another device having a memory, such as mobile phone 49. More than one phone number may be associated with each contact name. In this example, two phone numbers are associated with the contact name "John Smith"; a "Mobile" phone number and "Home" phone number. Since the user did not specify which phone number to call in voice command 86, the voice recognition system 23 may issue a system prompt 88 requesting that the user select one of the two phone numbers to call. System prompt 88 may include, for example, a question "Do you want to call his Mobile or Home?" The system prompt 88 may include an audible prompt broadcast from audio system 41 and/or a visual prompt displayed on display 44. The user may respond verbally to system prompt 88 through a voice command 90 identifying the number to call. In the example, the user selects the "Home" number to call.

Based on the input user voice commands (voice command 82, 86 and 90) the voice activated communication system 22 determines if any additional information is required to complete the requested task. In this example, the voice actuated communication 22 system has received the information needed to initiate the wireless phone call. The voice activated communication system 22 may notify the user of the status of the user request by issuing a system notification 92 informing the user that the requested task is being performed. For the example of initiating a wireless phone call, the system notification may include a statement, such as "Calling John Smith on his Mobile." The system notification 92 may include an audible notification broadcast from audio system 41 and/or a visual notification displayed on display 44.

The above described exemplary voice command sequence uses three separate voice commands to provide voice actuated communication system 22 with the information required to initiate the user requested wireless phone call. Two of the voice commands (i.e., voice commands 86 and 90) are in response to system prompts (i.e., system prompts 84 and 88). The voice recognition system 23 may use the previously input user voice commands (i.e., voice commands 82, 86 and 90) to determine if a corresponding voice command shortcut is available. Available voice command shortcuts may be stored in memory 62 of vehicle computing device 24. The user may use an available voice command shortcut to quickly and efficiently instruct the voice actuated communication system 22 to perform a particular task. Available voice command shortcuts may be associated with at least one corresponding series of voice commands. At least two voice commands are include in each corresponding series of voice commands. Either the voice command shortcut or its associated corresponding series of voice commands may be used to instruct the voice activated communication system 22 to perform a particular task.

In the exemplary voice command sequence illustrated in FIG. 3, the voice recognition system 22 determined that a voice command shortcut is available for the previously input series of voice commands 82, 86 and 90. The voice recognition system 23 may inform the user of the available shortcut by issuing a voice recognition system tip 94. The voice recognition system tip 94 may include a statement, such as "Next time you can say the command directly: Call John Smith on his Mobile." The voice recognition system tip 94 may include an audible notification broadcast from audio system 41 and/or a visual notification displayed on display 44.

Figure 4:
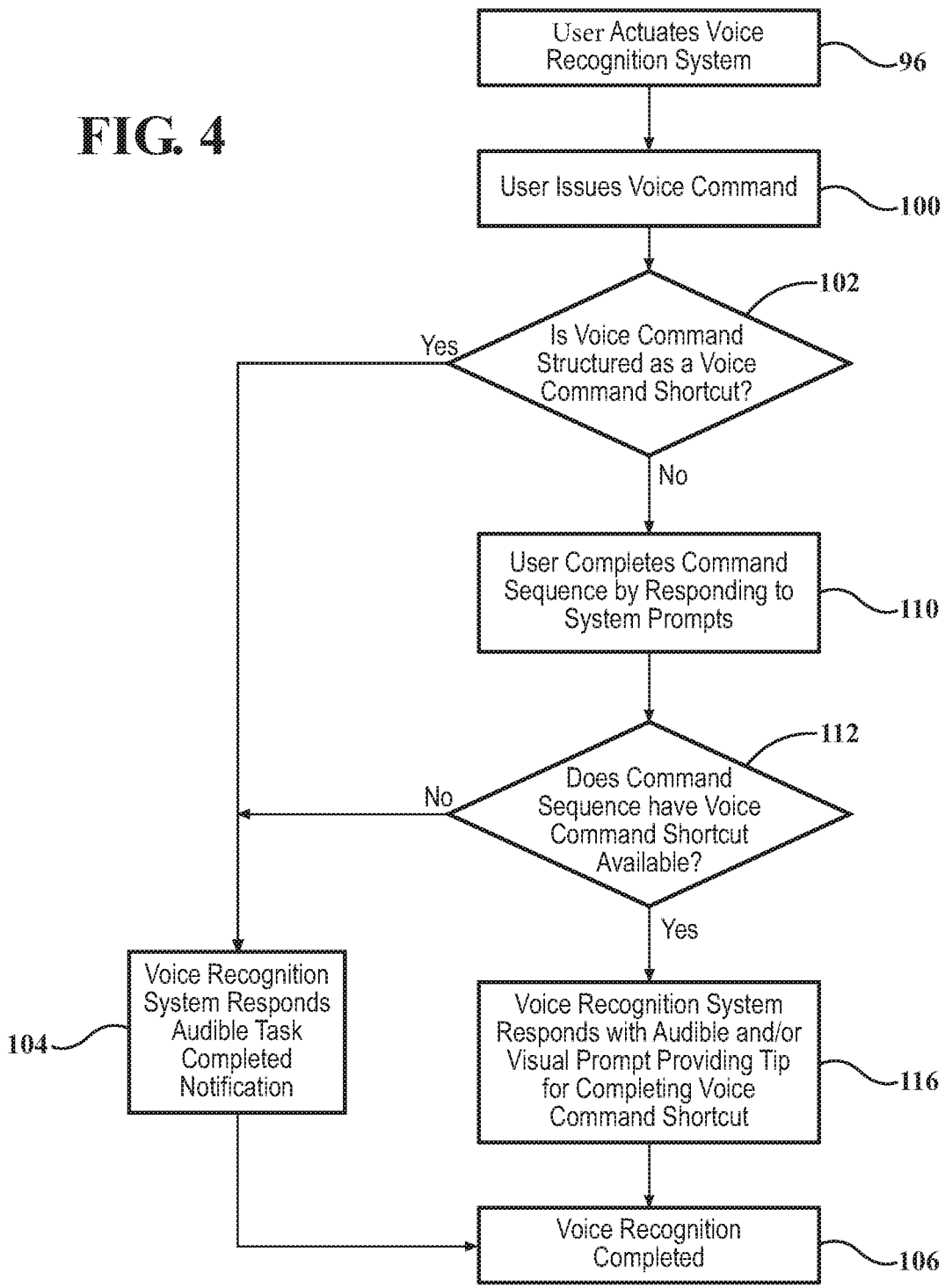
FIG. 4 schematically illustrates an exemplary method for determining a voice command shortcut based on a previously input user voice command sequence.

FIG. 4 describes an exemplary method for determining if a voice command shortcut is available and providing a tip to the user regarding its availability. A voice recognition session may be commenced by activating the voice recognition system 23 (step 96), for example, by actuating the voice recognition control 78 on a steering-wheel 80. The user may input a voice command (step 100) within a "listening window" following an audio prompt indicating the voice recognition session has commenced. The voice recognition system 23 determines whether the user voice command (input at step 100) is structured as a voice command shortcut (step 102). If the user voice command (step 100) is structured as a voice command shortcut the voice activated communication system 22 executes the voice command and issues a system notification informing the user that the requested task has been completed (step 104), which completes the voice recognition session (step 106). The system notification may include an audible notification broadcast from audio system 41 and/or a visual notification displayed on display 44.

If the voice recognition system 23 determines the user voice command (input at step 100) is not structured as a voice command shortcut (step 102), the voice recognition system 23 may prompt the user to input additional information required to complete the requested task. The voice recognition system 23 proceeds to issue system prompts requesting that the user input additional information required to complete the requested task (step 110). The system prompts may include an audible prompt broadcast from audio system 41 and/or a visual prompt displayed on display 44. The user may respond to system prompts by verbally providing the requested information through additional voice commands. Alternatively, the user may respond to the system prompts by manually selecting an appropriate response, which may include physically touching an appropriate response displayed on display 44.

When the user finishes responding to the system prompts for additional information (step 110), the voice recognition system 23 uses the previously input user voice commands (i.e., voice commands input at step 110) to determine if a corresponding voice command shortcut is available. If a voice command shortcut is available the voice recognition system 23 proceeds to inform the user of the available voice command shortcut by issuing a voice recognition system tip (step 116). The voice recognition system tip may include an audible notification broadcast from audio system 41 and/or a visual notification displayed on display 44. If no voice command shortcut is available the voice recognition system 23 executes the user voice commands and issues a system notification informing the user that the requested task has been completed (step 104), which thereby completes the voice recognition session (step 106).

It is intended that the scope of the present methods and apparatuses be defined by the following claims. However, it must be understood that the disclosed systems and methods for notifying a user of an available voice command shortcut may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A method for providing notification of an available voice command shortcut for controlling one or more systems of a vehicle, the method comprising:
   receiving, from a microphone incorporated in the vehicle, a first voice command of a series of voice commands that, when combined and transformed into electrical signals, provide instructions to a voice actuated communication system to perform a requested task;
   receiving, from the microphone, a second voice command of the series of voice commands, the second voice command providing additional instructions to complete the requested task;
   determining, using a processor incorporated in the vehicle, an availability of a voice command shortcut based on the first and second voice commands, wherein the voice command shortcut comprises a single voice command that combines each of the first and second voice commands together, further wherein the voice command shortcut contains a complete set of instructions enabling the voice actuated communication system to perform the requested task;
   controlling, using the voice actuated communication system, the one or more systems of the vehicle based on the requested task; and
   providing a notification to a user, using at least one of a speaker and an interactive display incorporated in the vehicle, the notification indicating the availability of the voice command shortcut and notifying the user that the requested task is completed.

2. The method of claim 1, wherein (i) the voice command shortcut, and (ii) a combination of the first and second voice commands each contain the complete set of instructions for performing the requested task.

3. The method of claim 1, wherein providing the notification includes at least one of broadcasting an audible notification on the speaker, and presenting a visual notification on the interactive display.

4. The method of claim 1, wherein any one of:
   (i) the voice command shortcut; and
   (ii) a combination of the first and second voice commands
   is used to instruct the voice actuated communication system to perform the requested task.

5. The method of claim 1, further comprising:
   determining, using the processor, that additional instructions are required to complete the requested task after receiving the first voice command; and
   prompting the user for the additional instructions.

6. A method for providing notification of an available voice command shortcut for controlling one or more systems of a vehicle, the method comprising:
   receiving, from a microphone incorporated in the vehicle, a first voice command of a series of voice commands that, when combined and transformed into signals, provide instructions to a voice actuated communications system for performing a requested task;
   determining, using a processor incorporated in the vehicle, the first voice command is not formatted as a voice command shortcut;
   prompting a user for additional instructions for performing the requested task;
   receiving, from the microphone, a second voice command providing the additional instructions for performing the requested task;
   determining, using the processor, an available voice command shortcut based on the first and second voice commands, wherein the voice command shortcut comprises a single voice command that combines each of the first and second voice commands together, further wherein the voice command shortcut contains a complete set of instructions enabling the voice actuated communication system to perform the requested task;
   controlling, using the voice actuated communication system, the one or more systems of the vehicle based on the requested task; and
   providing a notification to the user, on at least one of a speaker and an interactive display, the notification indicating the available voice command shortcut.

7. The method of claim 6, wherein at least one of the first and second voice commands is provided in response to a prompt for instructions from the voice actuated communications system.

8. The method of claim 6, wherein (i) the voice command shortcut, and (ii) a combination of the first and second voice commands each contain the complete set of instructions for performing the requested task.

9. The method of claim 6, wherein determining, using the processor, the available voice command shortcut comprises:
   determining, using the processor, if the voice command shortcut is available based on the task performed by the first voice command and the second voice command.

10. The method of claim 6, wherein determining, using the processor, the available voice command shortcut comprises:
    determining, using the processor, if the voice command shortcut is available based on instructions received from the first voice command, and the additional instructions received from the second voice command.

11. The method of claim 6, wherein prompting the user for additional instructions to complete the requested task comprises:
    determining, using the processor, a need for additional instructions to complete the requested task; and
    prompting the user for the additional instructions.

12. A system for notifying a user of an available voice command shortcut for controlling one or more systems of a vehicle, the system comprising:
    a microphone incorporated in the vehicle;
    at least one of a speaker and an interactive display incorporated in the vehicle; and
    a processor, incorporated in the vehicle, and including a non-transitory computer-readable medium having instructions embodied thereon that, when executed by the processor, perform operations in a vehicle, the operations comprising:
        receiving a first voice command of a series of voice commands that, when combined and transformed into electrical signals, provide instructions to a voice actuated communication system to perform a requested task;
        receiving a second voice command of the series of voice commands, the second voice command providing additional instructions to complete the requested task;
        determining an available voice command shortcut based on the first and second voice commands, wherein the voice command shortcut comprises a single voice command that combines each of the first and second voice commands together, further wherein the voice command shortcut contains instructions enabling the voice actuated communication system to perform at least a portion of the requested task;

controlling, using the voice actuated communication system, the one or more systems of the vehicle based on the requested task; and providing a notification to a user, on at least one of the speaker and the interactive display, the notification indicating the available voice command shortcut.

13. The system of claim 12, wherein any one of:
(i) the voice command shortcut; and
(ii) a combination of the first voice command and the second voice command is used to instruct the voice actuated communication system to perform the requested task.

14. The system of claim 12, wherein the operations further comprise:

providing a notification to the user that the requested task is completed.

15. The system of claim 12, wherein the operations further comprise:

determining that additional instructions are required to complete the requested task based on the first voice command; and prompting the user for the additional instructions, wherein the second voice command is received in response to the prompting for additional instructions.

16. The system of claim 12, wherein determining the available voice command shortcut comprises:

determining if the voice command shortcut is available based on the requested task performed in response to the first voice command and the second voice command.

17. The system of claim 12, wherein determining the available voice command shortcut comprises:

determining if the voice command shortcut is available based on instructions received from the first voice command and the second voice command.

18. The system of claim 12, wherein at least one of the first voice command and the second voice command are received responsive to a prompt for information.

* * * * *